United States Patent [19]

Schulze

[11] Patent Number: 4,561,947
[45] Date of Patent: Dec. 31, 1985

[54] PROCESS FOR THE RECOVERY OF NOBLE METALS FROM ORES; WHICH PROCESS USES THIOUREA

[75] Inventor: Reinhold Schulze, Hamburg, Fed. Rep. of Germany

[73] Assignee: SKW Trostberg Aktiengesellschaft, Trostberg, Fed. Rep. of Germany

[21] Appl. No.: 578,698

[22] Filed: Feb. 9, 1984

[30] Foreign Application Priority Data

Feb. 22, 1983 [DE] Fed. Rep. of Germany ....... 3306130

[51] Int. Cl.$^4$ .......................... C22B 11/04; C25C 1/20
[52] U.S. Cl. .................................. 204/109; 75/101 R; 75/104; 75/118 R; 210/903; 423/24; 423/27
[58] Field of Search ...................... 423/27, 24; 75/109, 75/118 R, 101 R, 104; 210/903; 204/109

[56] References Cited

U.S. PATENT DOCUMENTS

| 3,969,244 | 7/1976 | Kobayashi et al. | 75/118 R |
| 4,011,304 | 3/1977 | Mancini et al. | 423/224 |
| 4,145,212 | 3/1979 | Bodson | 75/118 R |
| 4,283,224 | 8/1981 | Stewart | 423/24 |
| 4,342,591 | 8/1982 | Lesoille | 75/101 R |

FOREIGN PATENT DOCUMENTS 132167 11/1978 Japan ................... 210/903

OTHER PUBLICATIONS

Perry's Chemical Engineer's Handbook, McGraw-Hill Book Co., 1973, pp. 3–43.

Primary Examiner—John Doll
Assistant Examiner—Jeffrey E. Russel
Attorney, Agent, or Firm—Felfe & Lynch

[57] ABSTRACT

The present invention provides a process for the hydrometallurgical recovery of noble metals from materials containing them by treatment with thiourea in an aqueous, acidic medium in the presence of an oxidation agent, wherein the aqueous medium simultaneously contains an oxidation agent and a reduction agent.

5 Claims, 7 Drawing Figures

Figure 1:
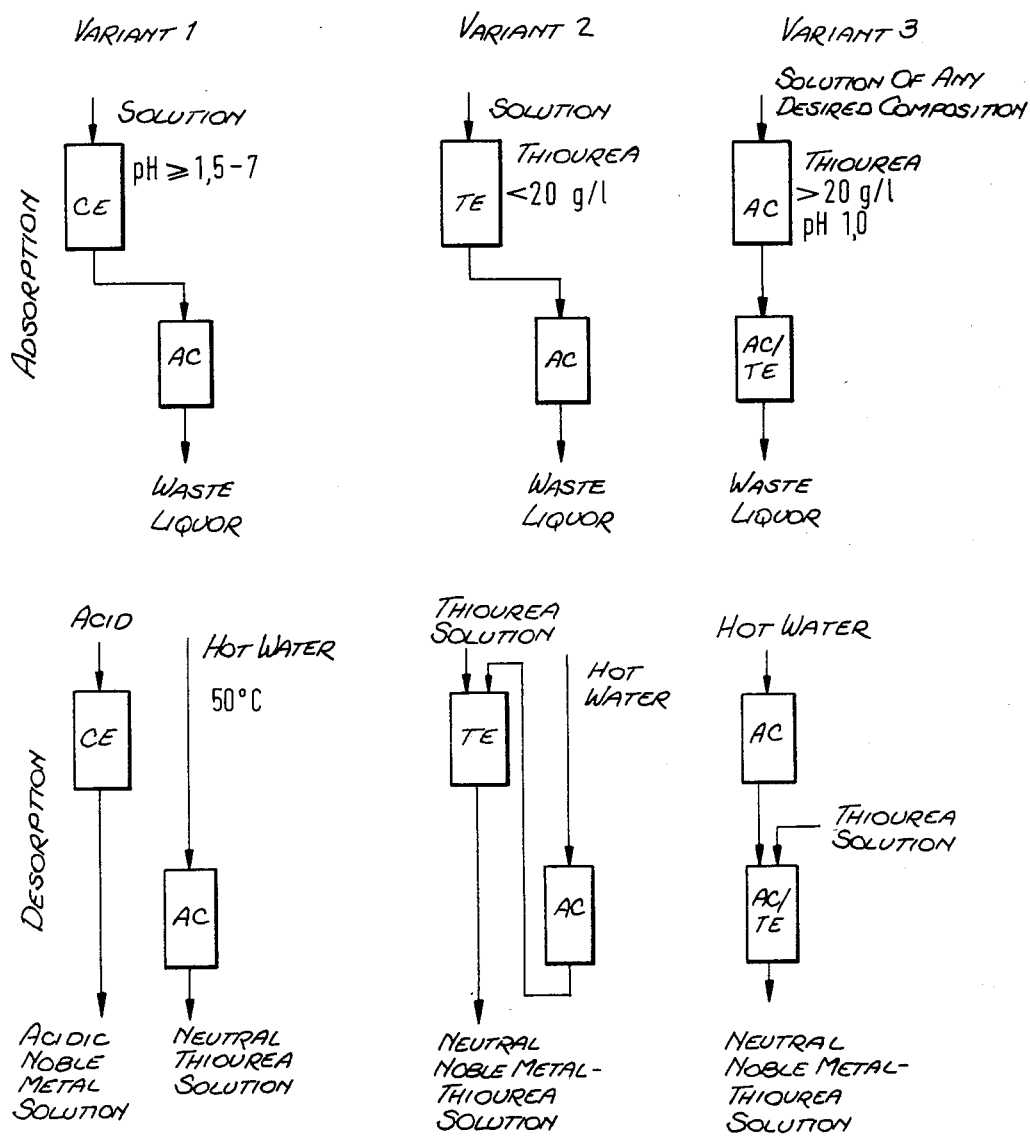

FIG.1 Working Up Of Thiourea-Noble Metal Solutions

PROCESS FOR THE RECOVERY OF NOBLE METALS FROM ORES; WHICH PROCESS USES THIOUREA

The present invention is concerned with a process for the recovery of noble metals from ores, which process uses thiourea instead of highly toxic cyanides and, at the same time, makes possible the working up of cyanide-resistant ores.

In the process technology of noble metal recovery today, alkaline cyanide leaching solutions are generally used in which atmospheric oxygen acts as oxidation agent. This use of dilute alkali metal cyanide solutions requires large volumes, as well as long reaction times, which is disadvantageous for the chemical, energy and investment costs and thus for the production costs of the noble metals.

The use of thiourea as a complexing agent in the recovery of noble metals is already known from German Patent Specification No. 543,304. Such processes which employ thiourea hitherto suffered from the disadvantage of a very high chemical consumption since further special chemicals are necessary. Thus, Rumanian Patent Specification No. 60,351 recommends leaching the ore in acidic thiourea solution in the presence of potassium chlorate, whereas in Federal Republic of Germany Patent Specification No. 2,746,661, for the noble metal extraction of residues from zinc leaching there is recommended the addition of an organic solvent for sulphur, for example a chlorinated hydrocarbon, the mixture being heated to boiling temperature. German Democratic Republic Patent Specification No. 151,634 describes the recovery of gold from porcelain shards and other gilded materials by the action of thiourea and ferric sulphate in sulphuric acid solution and the passing in of air. A disadvantage of all these processes is the high consumption of thiourea due to the strong oxidation action of the ferric salt, together with the atmospheric oxygen. T. Groenewald describes in Hydrometallurgy, 1, 277–290/1976, the high losses of thiourea when carrying out the leaching process in the presence of ferric salts as a result of oxidation. J. B. Hiskey confirms in Proceedings from the 110th AIME Meeting, Chicago, Feb. 22–26, 1981, p. 83, the rapid dissolving ability of thiourea with regard to gold, R. A. Pyper and J. L. Hendrix refer in the same place (p. 93 et seq.) to an over 90% extraction rate of noble metals but high consumption of thiourea must be taken into account.

All these previously described processes using thiourea in the process of noble metal leaching have in common a high consumption of thiourea so that the use of this chemical, in spite of its uncontestable advantages, was limited to a few special cases and, in general, leaching with cyanides, in spite of their toxicity, long reaction times and disturbance due to accompanying organic materials and accompanying elements, such as arsenic, antimony and copper, especially in the form of their sulphides, was preferred.

Therefore, there is a need to provide a process which does not suffer from the abovementioned disadvantages and which makes it possible to extract noble metals from their ores with a high degree of economy.

Surprisingly, we have now found that, with the help of thiourea, it is possible, when maintaining certain reaction conditions, to recover noble metals from their ores in relatively short leaching times and in high yield.

Thus, according to the present invention, there is provided a process for the hydrometallurgical recovery of noble metals from materials containing them by treatment with thiourea in an aqueous, acidic medium in the presence of an oxidation agent, wherein the aqueous medium simultaneously contains an oxidation agent and a reduction agent.

The use of thiourea is especially preferred since, by means of its action, noble metals are brought into solution especially quickly in the form of complexes. Therefore, it can be used in relatively high concentrations in the case of the simultaneous presence of an oxidation agent, cheap ferric salts being preferably used.

Since iron is a natural accompanying element in many ores, a special addition thereof is unnecessary. Due to the high concentrations of thiourea and oxidation agent, there is achieved, without additional expenditure for apparatus, a considerable shortening of the leaching procedure and thus a considerable reduction of the investment costs. Accompanying materials in the ores or noble metal-containing materials, such as carbon-containing organic compounds and metal compounds of ores, antimony and copper, especially in the form of their sulphides, disturb the leaching procedure using thiourea to a considerably lesser extent than when using cyanides. For this reason, a large number of "problem ores", which are cyanide-resistant or require an uneconomically high chemical consumption or extraordinarily long leaching times, can, with the help of thiourea, be used for the noble metal recovery, insofar as the conditions according to the process of the present invention are maintained.

The process of the present invention depends upon the surprising recognition that the leaching of noble metal-containing ores with thiourea is carried out in the simultaneous presence of an oxidation agent and of a reduction agent. In spite of the high concentration of thiourea in the solution, the consumption of thiourea in the case of the simultaneous presence of an oxidation agent and of a reduction agent can be practically neglected in carrying out the leaching procedure. Therefore, consumptions of chemicals occur substantially only in the case of the oxidation and reduction agents.

As oxidation agents, in addition to the abovementioned ferric salts, there can also be used, for example, chlorine, peroxides, nitrates and chlorates. As reduction agent, it is especially preferred to use sulphur dioxide which, for example, can also be employed in the form of sulphites, hydrogen sulphites, pyrosulphites and the like.

The system ferric salt/sulphur dioxide is technically and economically especially preferred since trivalent iron is, in many cases, sufficiently present in the raw material and sulphur dioxide is often obtained from roasting processes as troublesome by-product. Furthermore, in the course of the leaching process, the sulphur dioxide is converted into sulphuric acid and serves to maintain an acidic pH value in the ore suspension. This combination of thiourea, ferric salt and sulphur dioxide makes it possible, in the case of a considerably shorter leaching time, to obtain a substantially higher yield of noble metal and, in addition, also to make available to the noble metal recovery raw materials which cannot be digested with cyanides. Finally, the chemical concentration, which is considerably higher than in comparison with cyanide leaching, also leads to substantially higher noble metal concentrations in the leaching solutions. On the other hand, these advantageously high concentrations necessitate a recovery of the thiourea at the end of the leaching which is as complete as possible in order to use it again in the leaching process and to recover the noble metals quantitatively from the thiourea solutions.

First, the adsorbed noble metals are washed out of the ore residues with concentrated thiourea solution and possibly with acids. Subsequently, the thiourea adsorbed in the ore residues is recovered with hot water. The use of higher temperatures leads to especially highly concentrated solutions of noble metals.

The thiourea and the noble metals must now be recovered from the solutions obtained. Processes suitable for this purpose include adsorption by means of active charcoal, as well as with the use of ion exchange resins. The use of the most appropriate agent depends upon the concentration of the solutions and can be seen from the summary in the following Table 1. We have found that noble metals are adsorbed on to active charcoal from all solutions which do not have too high a thiourea concentration; otherwise, strongly acidic cation exchangers or thiol resins must be employed.

J. B. Hiskey reports in Proceedings from the 110th AIME Meeting, Chicago, 22–26, February 1981, on page 88, right column, that there is still no commercially interesting process which permits gold to be obtained from thiourea solutions.

FIG. 1 of the accompanying drawings indicates those processes which can be carried out economically, having regard to what has been stated above.

Variant 1

From moderately acidic thiourea solutions (pH value 1.5 to 7), the noble metals are first eliminated by means of strongly acidic cation exchangers and the thiourea is subsequently adsorbed on active charcoal. The desorption takes place separately, the noble metals being eluted with acid and the thiourea with water.

TABLE 1

Working up of thiourea-noble metal solutions by adsorption on active charcoal, cation exchangers and thiol resins and subsequent desorption

| concentration in the solution | | working up step for | | | |
|---|---|---|---|---|---|
| | | noble metal | | thiourea | |
| thiourea | acid | adsorption on | desorption by | adsorption on | desorption by |
| <20 g/l. | pH >1.5 | charcoal | thiourea soln. | charcoal | hot water of over 50° C. |
| | | thiol resin | thiourea soln. | | |
| | | cation exch. | acid | | |
| >20 g/l. | pH >1.5 | cation exch. | acid | charcoal | |
| <20 g/l. | pH <1.0 | charcoal | thiourea soln. | charcoal | |
| | | thiol resin | thiourea soln. | thiol resin cation exch. | |
| >20 g/l. | pH <1.0 | — | — | charcoal thiol resin cation exch. | |

The amounts of adsorption agent to be used depend upon the noble metal and thiourea concentrations present in the solutions. The loading capacities for the noble metals are from 1 to 100 g. per kg. of adsorption agent. For thiourea, the loading capacities are from 100 to 250 g. per kg. of adsorption agent.

Variant 2

From solutions with thiourea contents of <20 g./l., for example from wash waters, the noble metals are adsorbed on to ion exchange resins of the thiol type, whereafter there follows the elimination of the thiourea on active charcoal. In the case of the desorption, the thiourea is first desorbed from the charcoal with hot water and the solution, optionally mixed with additional thiourea, is used for the recovery of the noble metals from the ion exchanger.

Variant 3

For solutions of any composition but especially for solutions which simultaneously have a high concentration of acid (pH < 1.0) and of thiourea (>20 g./liter), in the first step the thiourea content is lowered to < <10 g./liter by adsorption on active charcoal so that subsequently the noble metals are also adsorbed on active charcoal or on ion exchangers of the thiol type. Regeneration with hot water again sets free the thiourea in high concentration. If necessary after increasing in concentration with additional thiourea (>20 g./liter), this solution, in turn, desorbs the noble metals and makes possible their transfer into pure, concentrated, neutral solution in the recovery step, for example with metallic zinc.

Figure 2:
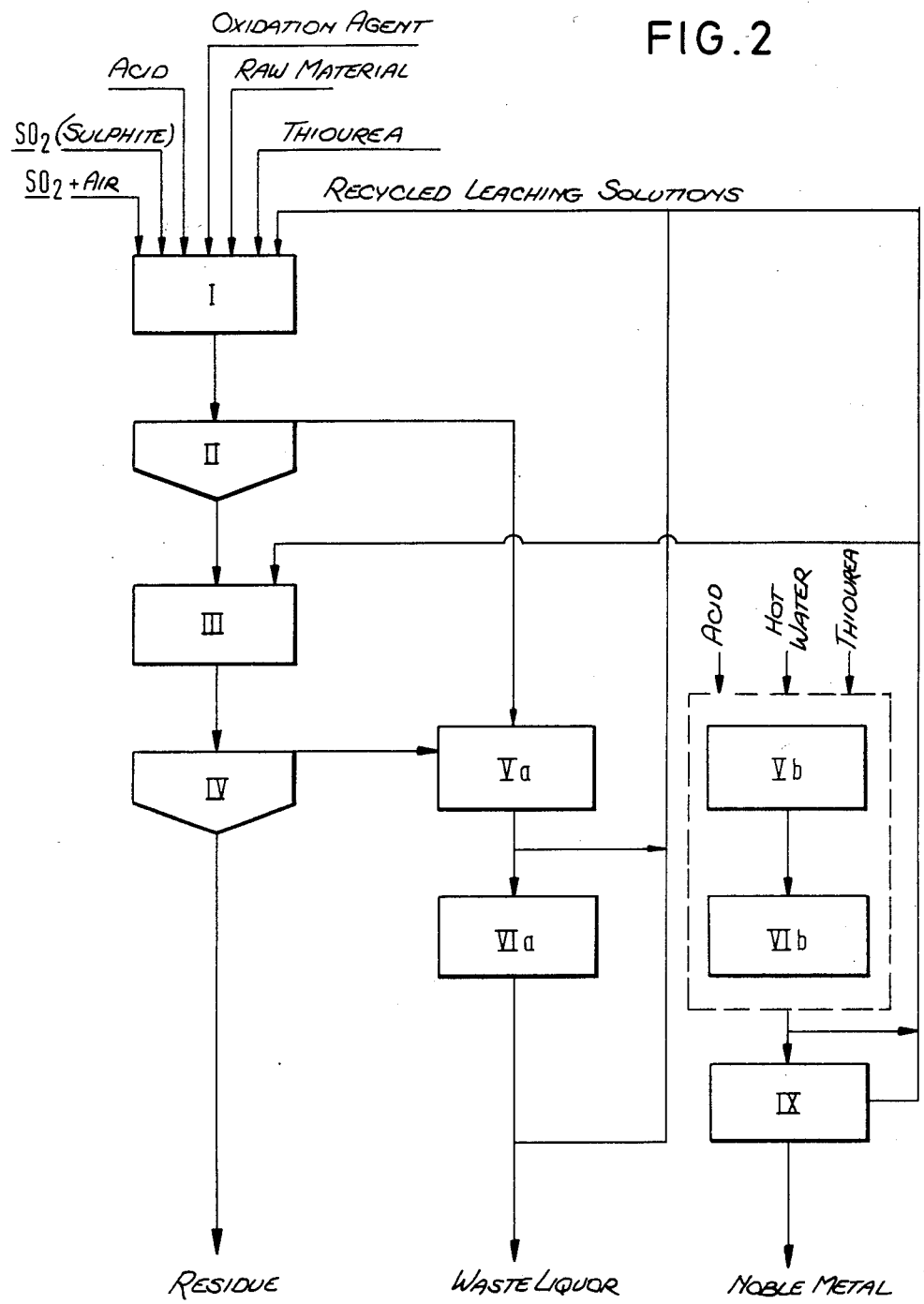

Having regard to the possibilities of working up the thiourea-noble metal solutions given in Table 1, FIG. 1, for the noble metal leaching with acidic thiourea solution there is given the process scheme illustrated in FIG. 2 of the accompanying drawings.

The leached out raw material is, after separating off of the leaching solution in (II), subjected, for the recovery of the adsorbed noble metals and of the adsorbed thiourea, to a desorbing washing in (III) and, after separation of the wash water in (IV), removed.

Ore leaching solution from (II) and wash solutions from (IV) are passed separately to the two-stage adsorption (Va, VIa) where, corresponding to FIG. 1, they give up their thiourea and noble metal content according to Variant 1, 2 or 3. The liquor running off is recycled to the leaching step or, in the case of a high content of impurities, is partly discarded.

For the desorption of the noble metals from the active charcoal and the thiol resin, there is used a thiourea solution or an acid in the case of the use of cation exchangers. The thiourea is recovered with hot water (Vb or VIb) by desorption from the active charcoal. The desorption schematically illustrated in FIG. 2 is described in FIG. 1 in detail for the process variants 1 to 3.

In the case of the leaching out (I), due to the oxidation agent, which can also originate from the ore and can be compounds of higher valency of iron, manganese and copper, thiourea is also always oxidised.

The introduction of sulphur dioxide in gaseous form or bound in the form of sulphite prevents the oxidation of the thiourea practically completely, without disadvantageously influencing the extraction of the noble metals from the ore.

A further characteristic of the process according to the present invention is the high redox potential in the digestion leaching liquor (I). The greatest dissolving speeds for the noble metals are achieved in the case of a redox potential of 250 to 600 mV, measured against an Ag/AgCl electrode. It is preferred to operate in a range of 380 to 450 mV.

The reduction agent is to be added in an amount such that only the oxidised thiourea is reformed. The amount of reduction agent to be added can be determined from the analytically determined thiourea decrease in the digestion leaching liquor, one reduction equivalent thereby corresponding to one mole of oxidised thiourea.

Many raw materials contain, from their very nature, sufficient acid-soluble, trivalent iron as oxidation agent. If necessary, oxidation agents, preferably acid-soluble compounds of trivalent iron, are added. In order to keep the salt loading of the leaching liquors and thus the liquid removal within limits, it is expedient to reform consumed trivalent iron from divalent iron by oxidation with a sulphur dioxide air current.

Ores which, in addition to noble metals, also contain uranium, can be treated by the process according to the present invention. The noble metals are hereby dissolved in a short time in high yield. By adsorption on active charcoal, the noble metals, such as gold, are selectively separated from the uranium remaining in solution.

The following Examples are given for the purpose of illustrating the present invention:

EXAMPLE 1

(cf. FIG. 2)

A strongly weathered lead-zinc ore contains, by weight, 5% lead, 6.8% zinc and 26.5% iron, as well as 315 g./t. of silver and 10.6 g./t. of gold.

350 g. of the ground (<44 μm) ore were stirred in 1 liter of thiourea solution (30 g./liter) at ambient temperature and at a pH value of 1.5 (I).

The pH value was kept constant by measuring in sulphuric acid.

An addition of oxidation agent to the noble metal leaching was not necessary since the ore contained sufficient soluble trivalent iron in order always to keep the redox potential above about 300 mV, referred to a silver-silver chloride electrode (3M KCl). The thiourea concentration was determined analytically at intervals of 15 to 30 minutes. Due to the oxidation of the thiourea, it showed a marked tendency to decrease.

After each concentration determination, the oxidised thiourea was again reduced by adding the calculated amounts of sodium hydrogen sulphite. The calculation was based on the fact that 1 reduction equivalent corresponds to 1 mole of oxidised thiourea.

After a reaction time of 5.5 hours, the ore sludge was filtered off. The total amount of sodium hydrogen sulphite consumed amounted to 3.7 g. Referred to one tonne of ore and recalculated as sulphur dioxide, there was given a specific reduction agent requirement of:

$$\frac{3.7 \text{ g. NaHSO}_3}{0.35 \text{ kg. ore}} \times \frac{1000 \text{ kg.}}{\text{tonne}} \times \frac{1 \text{ kg.}}{1000 \text{ g.}} \times$$

$$\frac{64.06 \text{ [SO}_2\text{]}}{104.06 \text{ [NaHSO}_3\text{]}} = 6.5 \text{ kg./tonne SO}_2$$

The effective thiourea consumption during the leaching out was given as follows, from the maximum concentration decrease of about 0.2 g./liter:

$$\frac{0.2 \text{ g./liter} \times 1 \text{ liter}}{0.35 \text{ kg. ore}} \times \frac{1000 \text{ kg.}}{\text{tonne}} \times \frac{1 \text{ kg.}}{1000 \text{ g.}} =$$

0.57 kg./tonne thiourea

The 0.825 liters of filtrate contained 22.1 mg./liter of silver and 2.55 mg./liter of gold, corresponding to a yield of 16.5% silver and 56.7% gold.

The leaching residue was washed in (III), first with 1 liter of a hot thiourea solution (90 g./liter) with a temperature of 90° C. in order to liberate adsorbed noble metal.

This first wash solution was thereby enriched to a content of 40.9 mg./liter of silver and 0.983 mg./liter of gold, corresponding to a yield of 37.1% silver and 26.5% gold. The thiourea content was reduced by the washing from its original value of 90 g./liter to 79.4 g./liter.

In the second washing step in (III) with 1 liter of hot water with a temperature of 90° C., the noble metal yield increased by a further 1.32 mg. silver and 0.082 mg. gold, corresponding to 1.2% silver and 2.2% gold. Furthermore, the thiourea adsorbed on the ore residue was recovered. The wash liquor contained 15.9 g./liter thiourea.

The yields obtained are summarised as follows:

| step | gold % | silver % |
|---|---|---|
| leaching, 5.5 hours | 56.7 | 16.5 |
| 1st wash 1 liter of thiourea solution 90 g./liter at 90° C. | 26.5 | 37.1 |
| 2nd wash 1 liter of water at 90° C. | 2.2 | 1.2 |
| total yield | 85.4 | 54.8 |

COMPARATIVE EXAMPLE

For demonstrating the advantageousness of the process according to the present invention of leaching a noble metal-containing material in the case of the simultaneous presence of an oxidation agent and of a reduction agent in aqueous medium, there are given in tabular form (cf. Table 2) the results obtained with the lead-zinc ore according to Example 1, which correspond to the previous technique of treating with cyanide and thiourea.

TABLE 2

| | cyanide leaching | thiourea leaching | thiourea leaching in presence of red./oxid. agent (Example 1) |
|---|---|---|---|
| leaching time (h) | 24 | 24 | 5.5 |
| chemical consumption (kg/t) | 7 | 34.4 | 0.57 thiourea 6.5 SO$_2$ |
| gold yield (%) | 81.2 | 24.7 | 85.4 |
| silver yield (%) | 38.6 | 1.0 | 54.8 |

WORKING UP OF THE LIQUORS BY ADSORPTION/DESORPTION

The experiment gave three different thiourea-noble metal solutions. The noble metals must be separated herefrom and the thiourea recovered for further use.

Survey of the amounts and compositions of the solutions:

| | volume liters | thiourea g./liter | silver mg./liter | gold mg./liter | pH value |
|---|---|---|---|---|---|
| digestion liquor | 0.825 | 29.8 | 22.1 | 2.55 | 1.5 |

-continued

|  | volume liters | thiourea g./liter | silver mg./liter | gold mg./liter | pH value |
| --- | --- | --- | --- | --- | --- |
| 1st wash solution | 1.0 | 79.4 | 40.9 | 0.98 | >2.0 |
| 2nd wash solution | 1.0 | 15.9 | 1.32 | 0.082 | >2.0 |

The noble metals of the three solutions could be completely separated off in the first step according to FIG. 1, Variant 1 on a strongly acidic cation exchanger since the pH values in no case lay below 1.5. There was used a column with 100 g. exchanger filling, corresponding to a capacity of 285 mg. silver.

The column was regenerated with 0.23 liters of 0.5 molar sulphuric acid.

The three solutions were separately worked up for thiourea in order to be able to use it again for various purposes.

DIGESTION LIQUOR

After adsorption of the noble metals in (Va) on a cation exchanger according to FIG. 1, Variant 1, the noble metal-free solution was returned to (I) for the renewed leaching of ore.

FIRST WASH SOLUTION

The first wash solution obtained after the washing from (III) with a content of 79.4 g./liter thiourea was brought to a thiourea content of below 20 g./liter by adsorption on active charcoal according to FIG. 1, Variant 3. Use was made of 500 g. of active charcoal Hydraffin BK 12 a grain size of 0.5 to 1.6 mm.

From this solution, the remaining greater portion of the noble metals is removed in (VIa) (FIG. 2) by a further adsorption column which was filled with the same type of active charcoal.

SECOND WASH SOLUTION

The second wash solution is, before re-use in (III), regenerated by the adsorption of the thiourea in (Va). For the adsorption on active charcoal in (Va), there was given a capacity of 140 g. thiourea per kg. of active charcoal. Simultaneously, small amounts of noble metal were co-adsorbed from the solution.

The contents of noble metal and thiourea on the adsorption columns (Va) and (VIa) (FIG. 2) originating from the digestion liquor and the first and second wash solutions were desorbed by the application of hot water with a temperature above 60° C. and the noble metal recovery was carried out in (IX) (FIG. 2) by cementation with zinc or electrolysis.

The thiourea solution freed from noble metals was returned to the leaching process according to (I).

There were obtained 60 mg. silver and 3.1 mg. gold, corresponding to a yield of 54% silver and 85% gold, referred to the amount of ore used.

The overall-loss of thiourea during the process was of the order of magnitude of 0.5 g., corresponding to 1 to 1.25 kg./tonne of ore used.

EXAMPLE 2

The ore here used contained 13 g./tonne of gold which, however, was embedded in pyrites.

Without pretreatment, such ores cannot be leached out. Hitherto, it has been usual to roast out the sulphur content of the pyrites in order to free the gold for the leaching out.

However, as pretreatment for the acidic thiourea leaching out, it appeared to be more advantageous to break up the pyrites by an acidic hydrometallurgical digestion. As digestion agent, there was used a hot ferric sulphate solution since it conforms systematically with the subsequent leaching out liquor.

Pretreatment 600 g. ore, ground (<44 μm.)
250 g. ferric sulphate (22.4% ferric iron)
600 ml. sulphuric acid (100 g./l. $H_2SO_4$) were stirred for 5 hours at about 95° C. and thereafter filtered off.

Leaching out

The moist, unwashed filter cake was slurried with 600 ml. thiourea solution (1 molar) and stirred for 2 hours at ambient temperature.

An oxidation agent addition was not necessary since sufficient trivalent iron was introduced into the leaching out batch with the filter cake moisture in order to keep the redox potential at about 400 mV, measured against an Ag/AgCl reference electrode. In the same way, the pH value remained practically constant at about 0.9 during the whole period of the leaching out due to the digestion acid introduced with the filter cake moisture.

The initial thiourea concentration of 28.5 g./liter showed the expected tendency to decrease. However, it could be maintained at a mean value of 28.3 g./liter by blowing in small amounts of gaseous sulphur dioxide. With a liquid volume of 0.81 liter and an ore input of 600 g., there was calculated therefrom a specific thiourea consumption of 0.27 kg./tonne. The leaching batch was filtered off, washed with 1 liter of hot thiourea solution (90 g./liter) with a temperature of 90° C. and thereafter with 1 liter of hot water with a temperature of 90° C. and subsequently dried. There were obtained 560 g. of ore residue containing 2.2 g./tonne of gold, which corresponds to a gold extraction rate of 84.2%.

EXAMPLE 3

For this Example, there was used a material containing, by weight, 40% antimony (as oxide), 30% carbon and 179 g./tonne of gold, as well as silicates and non-digested pyrites which was obtained as a residue from the roasting of pyritic antimony ore and from which the noble metals could not be extracted by the use of cyanides.

A part of the gold was adsorptively bound on the antimony oxide, the remainder being embedded in the silicates and in the non-digested pyrites.

Such residues are as poorly leached out with cyanides as ores with certain organic (free carbon containing) and inorganic (clayey) components.

By using the process described in Example 1, such residues can be successfully treated and the gold contained therein recovered in satisfactory yields.

There were used:
1000 g. residue with a content of 179 g./tonne of gold
1500 ml. thiourea solution (30 g./liter thiourea) and
2.1 g. sulphur dioxide (in the form of sodium sulphite).

As a result, 95.7 mg. gold were obtained, which corresponded to a yield of 53.5%.

The thiourea was recovered practically quantitatively by a hot washing of the leaching residue.

EXAMPLE 4

As starting material there were used dump residues which contained 0.53 g./tonne of gold and 115 g./tonne of uranium. Both metals were to be dissolved in a sulphuric acid medium by a common leaching out and subsequently selectively separated. Half of the gold was present as leachable metal, the other half being unavailably embedded in the mineral components.

There was produced a suspension of the following composition:
825 g. dump material
600 ml. water
75 ml. sulphuric acid (150 g. $H_2SO_4$/liter)
1.5 g. natural manganese dioxide The suspension was stirred for 2 hours at 60° C. Thereafter, according to Table 3, thiourea or a mixture of thiourea and sodium pyrosulphite is added thereto. Within 20 minutes, the gold concentration in the experiments 1 and 2 increased to 0.3 mg. gold/liter, which corresponded to the complete removal of the soluble portion of gold. For extracting the uranium, it was stirred for a further 5 hours. The residue obtained after this time was, after filtering off, investigated for its content of gold and uranium.

The results obtained are given in the following Table 3:

TABLE 3

| experiment | thiourea g./tonne | sodium pyro-sulphite | gold g./t.in residue | gold % yield | uranium g./t.in residue | uranium % yield |
|---|---|---|---|---|---|---|
| 1 | 1 | — | 0.27 | 49 | 28 | 75.6 |
| 2 | 0.5 | 0.33 | 0.26 | 50 | 27 | 76.5 |
| 3 | 0.5 | — | 0.36 | 32 | 29 | 74.8 |

In working up this dump residue, it was shown that the process according to the present invention also gave the highest yields of gold, even in the presence of uranium.

When the leaching out was carried out at 30° C., a somewhat higher thiourea concentration was necessary in order to achieve the same result.

4.2 GOLD RECOVERY

From the above experiment 2, 0.86 liter of solution were obtained which contained 0.3 mg./liter of gold and 99 mg./liter of uranium.

By treatment of the solution with 0.3 g. granulated active charcoal (type Norit PK 0.25-1), within 5 hours the gold concentration was reduced to a value below the detection limit of <0.1 mg./l. The total amount of gold was found to be adsorbed on the active charcoal.

The gold was obtained in elementary form by burning the active charcoal. The uranium remained (93 mg./liter) practically completely in solution and could be recovered therefrom by known processes.

I claim:

1. In a process for the hydrometallurgical recovery of noble metals selected from the group consisting of gold and silver, from materials containing them, by treatment with thiourea in an aqueous, acidic medium in the presence of an oxidation agent, the improvement wherein the aqueous medium simultaneously contains an oxidation agent and a reduction agent and wherein there is maintained a redox potential of 250 to 650 mV against an Ag/AgCl electrode in said medium.

2. Process according to claim 1, wherein the oxidation agent used is trivalent iron and the reduction agent used is sulphur dioxide in free or bound form.

3. In a process for the hydrometallurgical recovery of noble metals selected from the group consisting of gold and silver the steps comprising:
   (a) treating the noble metal-containing material in an aqueous medium under acidic pH conditions with thiourea in the simultaneous presence of ferric ions acting as an oxidation agent and of sulphur dioxide acting as a reduction agent, while maintaining a redox potential of 250 to 600 mV against an Ag-/AgCl electrode, to leach out materials;
   (b) separating the leached out solid materials from the noble metal-containing solution;
   (c) discarding the leached out residue;
   (d) adsorbing the thiourea from the solutions on to active charcoal;
   (e) adsorbing the noble metals on to active charcoal or on to an acidic cation exchanger or an ion exchanger resin of the thiol type;
   (f) partially recycling the thiourea-containing solution for use in step (a);
   (g) desorbing the thiourea from the active charcoal by hot water; and
   (h) desorbing the noble metals by means of a thiourea solution or by an acid, and recovering the noble metals by cementation using non-noble metals or by electrolysis.

4. Process of claim 3 wherein the oxidation agent is trivalent iron and the reduction agent is a sulphite, hydrogen sulfite or pyrosulfite.

5. Process of claim 3 wherein the separated leached out solid material of step (b) is washed with thiourea solution for recovery of residual noble metals, before discarding.

* * * * *